Sept. 7, 1954　　　　M. E. HIEHLE　　　　2,688,699
RADIO FREQUENCY LOAD ALTERNATING SYSTEM Filed May 3, 1943　　　　　　　　　　　　2 Sheets-Sheet 1

Inventor:
Michael E. Hiehle,
by Harry E. Dunham
His Attorney.

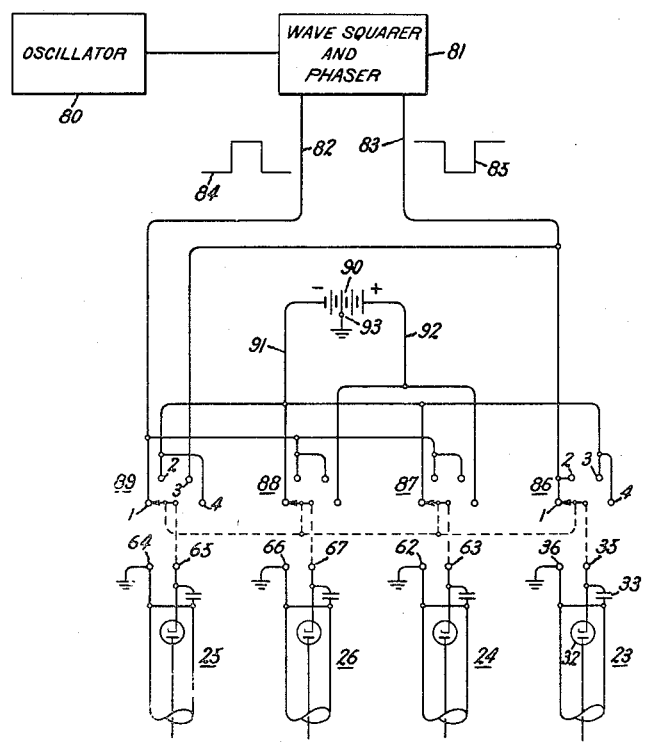

UNITED STATES PATENT OFFICE 2,688,699

RADIO FREQUENCY LOAD ALTERNATING SYSTEM

Michael E. Hiehle, Schenectady, N. Y., assignor to General Electric Company, a corporation of New York Application May 3, 1943, Serial No. 485,443

5 Claims. (Cl. 250—33.53)

My invention relates to signalling systems and in particular to such systems in which a radio input circuit is connected to more than one source of high frequency signals. It is an object of my invention to provide an improved switching circuit for such a system.

My invention relates more particularly to a signalling system having two or more antennae supplying signals to a single receiver and it has for one of its objects to provide improved means for selectively connecting one or more of the antennae to the apparatus and for matching the impedance of the connecting circuits for all arrangements thereof.

Another object of my invention is to provide such means particularly adapted for use at short wave lengths.

In pulse signalling systems used for ascertaining information with respect to distant objects, and in particular for determining distance to, and the direction of, such objects, it is customary to transmit radiant impulses at regularly recurring intervals. After each impulse corresponding impulses resulting from reflection from remote objects are received over a certain time interval. When two antennae arranged at different elevations are used with such equipment and the received signal is taken alternately from the antennae and viewed on the screen of a cathode ray tube, the difference in the signals received by the antennae is a measure of the height of the reflecting object. In such observations, switching from one antenna to the other must be performed at a rapid rate. This is accomplished most easily by electronic means which place either an open or a short circuit across the transmission lines connecting the antennae to the receiver. It is a further object of my invention to provide in a pulse signalling system of the above type an improved means for selectively connecting any one or all of the antennae to the receiver and for maintaining the impedance presented to the receiver under all antennae arrangements at a constant value.

Figure 1:
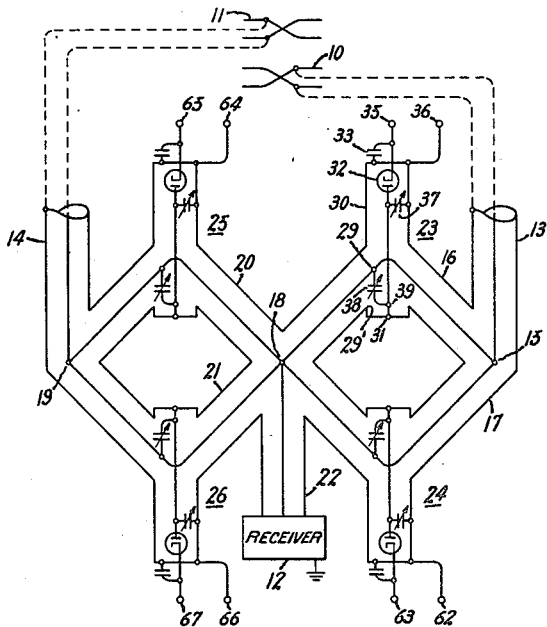
Figure 2:
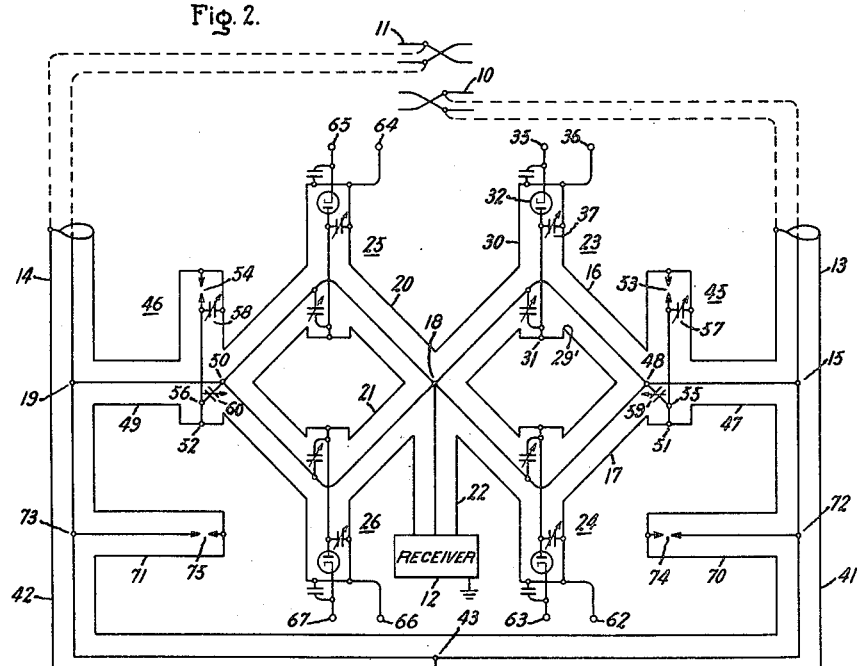

The features of my invention which I believe to be novel are set forth with particularity in the appended claims. My invention itself, however, both as to its organization and method of operation, together with further objects and advantages thereof, may best be understood by reference to the following description taken in connection with the accompanying drawing, in which Fig. 1 represents an embodiment of my invention; Fig. 2 shows a modification of the equipment shown in Fig. 1; and Fig. 3 shows a switching arrangement for use with the equipment of Figs. 1 and 2. In the several figures, corresponding reference numerals have been placed on corresponding elements to facilitate their comparison.

Referring to Fig. 1 of the drawing, I have shown at 10 and 11 a pair of antennae arranged at different elevations in a single vertical plane and supplying radio frequency signals to a single receiver 12. The antennae 10 and 11 and the receiver 12 may be, for example, a portion of an aircraft guidance system located at an airport and used for the purpose of determining the position and elevation of approaching aircraft, which information may then be transmitted to the craft for guidance of the same. While the antennae have been shown as two tiers of two colinear dipoles, each in the form of an array, each antenna may be composed of any number of arrays. For earliest detection of the approach of an aircraft, both antennae are connected in phase and directly to the receiver. When it is desired to use the system to determine the height of the craft, the received signals sent from the craft are taken alternately from the two antennae, the connections of the antennae with the receiver being switched at a rapid rate. It is apparent that in alternating between the two conditions when either one or both of the antennae are connected to the receiver, a substantial change in input impedance is presented to the receiver. For the purpose of avoiding reflections in the lines connecting the receiver with the antennae, it is desirable that the impedances of connecting circuits be matched at all times and under all conditions of operation.

The antennae 10 and 11 are connected respectively to coaxial transmission lines 13 and 14. Each of these lines, in turn, is connected to the receiver through a pair of parallel paths. The terminal point 15 of the line 13 is thus connected to the two lines 16 and 17 which, in turn, are joined together at their opposite ends at point 18. Similarly connected between the terminal point 19 of line 14 and point 18 are the two parallel lines 20 and 21. The line 22 connects receiver 12 with the point 18. For reasons which are explained in detail later, the lines 16, 17, 20 and 21 each have a length equal to an even multiple of a quarter wave length at the frequency of the oscillations to which the receiver and antennae are tuned.

In order to provide means selectively to connect the receiver 12 to either antenna 10 or antenna 11 or to both antennae at the same time, the electronic switching devices 23, 24, 25, and 26 are connected respectively across the transmission lines 16, 17, 20, and 21 at points spaced from the points 15, 18, and 19 by a distance which is equal to a quarter wave length at the operating frequency of the system or some odd multiple thereof. Thus, point 29, the point at which the electronic switching device 23 is connected across line 16, is spaced from both points 15 and 18 by distances equal to a quarter wave length or some odd multiple thereof.

The electronic switching device 23 comprises a short concentric transmission line 30 having spaced inner and outer conductors which are short-circuited at their lower ends at point 31 and are connected together at their opposite ends through diode 32 and capacitor 33 for high frequency alternating currents and through diode 32 and terminals 35 and 36 for unidirectional and low frequency alternating currents. The cathode of diode 32 is connected to terminal 35 and the outer conductor of line 30 is connected to terminal 36 so that these terminals 35 and 36 provide means for connecting a source of biasing potential in series with the diode 32.

The line 30 has a length between the point 31 and its upper end equal to a quarter wave length at the operating frequency of the system and capacitor 37 is connected between the inner and outer conductors of this line to adjust the same for resonance when the diode 32 is non-conducting. So constructed, the switching device 23, when diode 32 is not conducting, appears as a parallel resonant circuit connected across line 16 at point 29 and, consequently, has substantially no effect on the transmission of signals between the points 15 and 18 over line 16. When the device 32 is conducting, however, the resonant condition of line 30 is destroyed. As is seen on the drawing, line 30 is connected across the line 16 a short distance above the short-circuit point 31, the outer conductors being connected at point 29' and point 29 on the inner conductor of the line 16 being joined to point 39 on the inner conductor of line 30 through a variable capacitor 38. For optimum operation, the point of connection of line 16 across line 30 is a short distance from the lower short-circuited point 31 of line 30, this distance being such that the losses in the line 30 are equal for the two conditions when diode 32 is conducting and non-conducting, the distance between points 31 and 39 where the connection is made usually being equal to approximately one-eightieth of a wave length at the operating frequency.

When the condition of resonance of line 30 is destroyed, therefore, by conduction in the diode 32, the portion of line 30 between points 29 and 31 appears as a small inductive reactance connected across line 16 substantially at the points 29, 29'. By adjustment of capacitor 38 until the capacitance of this capacitor series resonates with this small inductive reactance of line 30, the switching device 23 serves to short-circuit line 16 at the point 29. Since this point is spaced from points 15 and 18 by a distance which is equal to a quarter wave length at the operating frequency of the system, this short-circuit across line 16 appears as a large impedance at points 15 and 18, and, therefore, conduction over line 16 is prevented during periods when diode 32 is passing current between its anode and cathode. When a cyclic biasing potential is provided between the terminals 35 and 36, therefore, line 16 may alternately be rendered conducting or non-conducting for signals received on antenna 10.

The construction of electronic switches 24, 25, and 26 is the same as that of switch 23 and these control devices, connected respectively across lines 17, 20, and 21, may be used for controlling transmission of signals over these lines in the same manner that control of transmission over line 16 is effected by the electronic switching device 23. Furthermore, the lengths of each of the lines 17, 20, and 21 are adjusted so that the electronic switches 24—26 are connected across these lines at points spaced a quarter wave length, or some odd multiple thereof, at the operating frequency of the system from points 18 and 15 in the case of switch 24 and from points 18 and 19 in the case of switches 25 and 26.

One form of switching arrangement which may be used with the circuits of Fig. 1 is shown in Fig. 3. The oscillator 80 provides a sinusoidal wave of voltage to the wave shaper and phaser 81 which functions to supply to the output conductors 82 and 83 balanced square waves 84, 85 of voltages of opposite phase. The exact construction of the oscillator 80 and the wave shaper and phaser 81 form no part of my invention and any suitable equipment may be used for these elements of the switching arrangement. The conductors 82 and 83 are connected to the fixed contacts of the multi-position switches 86, 87, 88, 89 in a desired arrangement. The movable contacts of switches 86—89 preferably are mechanically linked or ganged together for uni-control operation. A source of unidirectional potential, such as a battery 90 supplies fixed values of negative and positive potential to the remaining fixed contacts of switches 86—89, over leads 91, 92 connected to opposite terminals of battery 90. An intermediate terminal 93 of battery 90 is grounded.

The movable contact of switch 86 is connected to terminal 35 supplying biasing potential to the cathode of diode 32 of electronic switch 23, whose terminal 36 is grounded. Similarly, the movable contacts of switches 87—89 are connected respectively to the terminals 63, 67, 65 of electronic switches 24, 26, 25. The contact 1 of switch 86 is supplied with a square wave of potential from lead 83, the contact 1 of switch 89 is supplied with a square wave of potential of opposite phase from lead 82, and the contacts 1 of switches 87 and 88 are supplied with a constant negative biasing potential from battery 90. When the switches 86—89 are in this position, therefore, the diodes of electronic switches 23 and 25 are rendered non-conductive during alternate half cycles and receiver 12 is connected, in alternation, to antenna 10 and antenna 11 over lines 16 and 20 respectively. The diodes of electronic switches 24 and 26, however, are maintained conductive by the negative biasing potentials applied to their cathodes so that translation of received signals to receiver 12 over lines 17 and 21 is prevented so long as the switches 86—89 remain in this position.

When the switches are moved to the contact 2, it may be seen that the diode of electronic switch 23 remains connected to lead 83 so that translation of signals over line 16 remains the same as when the switch 86 was in position 1. The contact 2 of switch 25, however, is now connected to the negative terminal of battery 90 so that translation of signals over line 20 to receiver 12 is prevented when the switches are in this position. The switches 87 and 88, however, are now supplied with a square wave of voltage of phase opposite to that supplied to switch 86 so that receiver 12 on one half of each cycle is connected to antenna 10 and one the other half cycle, is connected to both antennae 10 and 11 over lines 17 and 21.

In the operation of the system thus far described, if the potentials impressed between the electrodes of the diodes of switches 23—26 are varied cyclically, by the arrangement shown in Fig. 3 signals to the receiver 12 may be supplied alternately from antenna 10 or antenna 11 or from both antennae at one time.

Consider first the operation when the diodes of switches 24 and 26 are biased to cutoff and opposite phases of an alternating potential are impressed across the diodes of switches 23 and 25. It is apparent that signals are supplied to receiver 12 alternately from antenna 10 over line 16 and antenna 11 over line 20, transmission over lines 17 and 21 being prevented by the apparent open circuit condition of the extremities of these lines. If lines 13, 14, 16, 20, and 22 all have equal surge impedances, whether signals are being supplied from antenna 10 or antenna 11, the impedance of the supplying circuit, as seen at the point 18, matches that of line 22. Consequently, no reflections of high frequency oscillations occur in the system under the above-outlined conditions.

It is apparent that when it is desired to supply signals to receiver 12 from the antennae 10 and 11 at the same time, if the lines 16 and 20 are used for transmitting these signals to the receiver, the impedance presented at the point 18 by the parallel lines 16 and 20 no longer matches the impedance of the line 22, but instead has a value which is one-half the impedance of the line 22. In order, therefore, to provide means for matching the impedance of the transmitting lines with the line 22 when signals are supplied from both antennae at the same time, transmission over lines 16 and 20 is blocked by biasing the diodes of switches 23 and 25 so that current flows in these diodes and transmission over lines 17 and 21 is permitted by biasing the diodes of switches 24 and 26 to cutoff. Also, the impedances of lines 17 and 21 between the points of connection of switches 24 and 26 and point 18 is adjusted so that the lines 17 and 21 in parallel present the proper impedance at the point 18. At the same time, between point 15 and the point of connection of switch 24, the impedance of line 17 is maintained equal to that of line 13 to prevent mismatching of impedances at point 15. Similarly, the impedance of line 21 between switch 26 and point 19 is maintained equal to that of line 14. If, therefore, the surge impedances of lines 13 and 14 at points 15 and 19 respectively have a value Z, the impedance of line 17 between point 15 and switch 24 and of line 21 between point 19 and switch 26 must likewise equal Z. Between these electronic switches and the point 18, however, the impedance of lines 17 and 21 is adjusted to equal $\sqrt{2}Z$. Thus, in the case of line 17, for example, since the length of line 17 between diode switch 24 and point 18 is a quarter wave length, the apparent impedance of the line 17 at point 18 is obtained from the equation $$Z_{18}=\frac{(\sqrt{2}Z)^2}{Z}=2Z$$

Similarly, the apparent impedance of line 21 at point 18 is equal to 2Z. As a result of this construction of lines 17 and 21, when the diodes of both devices 24 and 26 are nonconducting and signals are being supplied from both antennae 10 and 11 to receiver 12, the impedance of lines 17 and 21 in parallel at point 18 appears as Z. Under these operating conditions, of course, the diodes of switches 23 and 25 are maintained conducting so that transmission over lines 16 and 20 is prevented.

Alternatively, impedance matching of lines 17 and 21 to line 22 is obtained also by making the impedance of lines 17 and 21 from the points 15 and 19 to the connection of switches 24 and 26, respectively, equal to $\sqrt{2}Z$. Thus, at each of the switches 24 and 26, there is an effective impedance whose value is:

$$Z_{24}=Z_{26}=\frac{(\sqrt{2}Z)^2}{Z}=2Z$$

Further, the impedance of lines 17 and 21 between the points of connection of switches 24 and 26 and point 18 is adjusted to a value of 2Z so that matching is maintained throughout the lines. At the point 18, therefore, the paths 17 and 21 in parallel, each individually having an impedance of 2Z, present an impedance of Z to match that of line 22.

When the switching arrangement of Fig. 3 is used in conjunction with the circuits of Fig. 1 and the switches 86—89 are in position 1, antennae 10 and 11, in alternation, supply received signals to receiver 12 over lines 16 and 20. When the switches are moved to position 2, however, during one half cycle antenna 10 supplies signals to receiver 12 over line 16 and during the alternate half cycle both antennae are connected to receiver 12 by means of lines 17 and 21. In the third position of the switches, the connection is similar to that obtained with the switches in position 2, with the exception that now antenna 11 is connected to receiver 12 over line 20 during half of the time and both antennae are connected to the receiver over lines 17 and 21 during the remaining half of each cycle. In the fourth position of the switches, negative biasing potential is supplied to the cathodes of the diodes of switches 23 and 25 at all times so that translation of signals over lines 16 and 20 is blocked, while positive biasing potential is supplied by means of conductor 92 from battery 90 to the cathodes of the diodes of electronic switches 24 and 26 so that these diodes are rendered non-conductive and signals are translated from both antennae over lines 17 and 21. The above-outlined switching arrangement, of course, is merely illustrative and any other desired sequence of operation may be used.

Referring to Fig. 2, I have shown my load alternating device as applied to a pulse signalling system of the type in which radiant impulses are transmitted at regularly recurring intervals and after each impulse, corresponding impulses reflected from remote objects are received over a certain time interval. In this signalling system, the pair of antennae 10 and 11, again arranged in a single plane at different elevations, are supplied by the transmitter 40 with periodically recurring pulses to be radiated. These pulses of radiated energy may impinge upon distant reflecting surfaces and produce echoes which are received upon the antennae 10 and 11. In such an application, the transmission lines 41 and 42 are connected respectively to lines 13 and 14 at the points 15 and 19, the lines 41 and 42 joining at the point 43 to form a single line 44 connected to transmitter 40.

As is readily understood, the reflected signal supplied to the receiver 12, and which appears on the lines 13 and 14, is much weaker than that which is supplied by the transmitter 40 and which appears across these lines. Since the receiver 12 must be adapted to detect this weaker signal, the receiver may be adversely affected by the strong signal of the transmitter unless means is provided to prevent transmission of signals over lines 16, 17, 20, and 21 during the transmitting period. In order to protect the receiver 12 of Fig. 2 from the high intensity signals of the transmitter and to remove these signals from the lines 16, 17, 20, and 21, the protective devices 45 and 46, having the form of stub transmission lines, are connected respectively between line 13 and lines 16 and 17 and between line 14 and lines 20 and 21. For purposes to be explained later, transmission line 47 is connected between point 15 and point 48, the junction point of lines 16 and 17. Likewise, line 49 is connected between point 19 and point 50, the junction point of lines 20 and 21.

The lines 45 and 46, connected respectively across lines 47 and 49 at the points 48 and 50, are stub transmission lines, each having a length of a quarter wave length, or an odd multiple thereof, at the operating frequency of the system. The lines 45 and 46 are short-circuited at their lowermost ends at points 51 and 52 and are terminated at their upper ends by non-linear impedance devices 53 and 54. The devices 53 and 54 may be diodes, spark gaps, or any other suitable impedance members having non-linear impedance characteristics. For purpose of illustration, I have shown these devices as spark gaps, the spacing of electrodes being such that the gaps are non-conducting during the reception of the relatively weak reflected signals picked up by the antennae, but break down and become conducting whenever the transmitter sends out a pulse of high intensity.

The stub lines 45 and 46 are connected across transmission lines 47 and 49 at points 55 and 56 near their short-circuited points 51 and 52 and capacitors 57 and 58 are provided to adjust the electrical length of lines 45 and 46 to an exact quarter wave length at the frequency of the system so that for a wave of this frequency these lines are resonant lines short-circuited at one end and terminated in a non-linear impedance at the opposite end. At the low voltages present when the antennae are receiving signals and supplying them to the receiving apparatus, the tuned lines 45 and 46 present a very high parallel resonant impedance across the lines 47 and 49 and consequently have very little effect on signals transmitted over these lines to the receiver 12. When the transmitter 40 is sending out its pulse of high intensity signal, however, voltages of an intensity sufficient to break down the spark gaps 53 and 54 are built up on the lines 45 and 46 and conduction of current between the electrodes of the gaps results in detuning of the stub lines. Under these conditions, since the lines 47 and 49 are connected close to the lowermost terminals of lines 45 and 46, these stub lines present but a small net inductive reactance across lines 47 and 49.

In order to reduce still further the value of the impedance thus presented across lines 47 and 49, the variable capacitors 59 and 60 are provided respectively between points 48 and 55 and points 50 and 56 and are adjusted to series resonate with the small inductive reactance of the stub line.

As a result of this construction, the combinations of stub lines and capacitors 59, 60 appear as substantial short-circuits across lines 47 and 49. By careful adjustment of the capacitors 59, 60 to the point of exact series resonance with the stub lines 45, 46, the value of the impedance presented across the lines 47, 49 at the points 48, 50, may be reduced to a value less than 1 ohm so that the receiver 12 and the diode switches 23—26 are effectively isolated from the high intensity signal developed by the transmitting apparatus. By making the length of line 47 between points 15 and 48 and the length of line 49 between points 19 and 50 each equal to a quarter wave length at the operating frequency, the short-circuits across the lines 47 and 49 at points 48 and 50 are inverted to appear as high impedances at the points 15 and 19. Hence, while the series resonant circuits comprising the stub lines 45 and 46 and the capacitors 59 and 60 prevent the transmitter output from reaching the receiving apparatus, these circuits have no effect upon the transmitting apparatus itself.

In order to prevent any undesired reactances being presented at points 15 and 19 by transmitter 40 and lines 41 and 42 during a receiving period, which reactances tend to attenuate the received signals, the quarter wave length lines 70 and 71 are connected across lines 41 and 42 at points 72 and 73, respectively, spaced from points 15 and 19 by a distance equal to a quarter wave length at the operation frequency of the system. The opposite ends of the inner and outer conductors of lines 70 and 71 are connected together through non-linear devices, such as spark gaps 74 and 75, so that, during the reception of signals when the voltages on lines 41 and 42 are insufficient to cause a breakdown of the gaps 74 and 75, the high impedance of these gaps is inverted by the lines 70 and 71 to appear as short-circuits at points 72 and 73 and as large impedances at points 15 and 19. When the transmitter is operating, however, and voltages of high intensity appear across the gaps 74 and 75, these gaps break down and their small impedances are inverted by the lines 70 and 71 to appear as large impedances across lines 41 and 42 at points 72 and 73. In this manner the lines 70 and 71 function as a cut-out circuit to isolate the transmitter from the receiver during periods of reception.

The remainder of the circuit of Fig. 2 is essentially the same as that of Fig. 1. The impedances of lines 16 and 20 again are made equal to Z. Also, the impedances of line 17 between switch 24 and point 48 and of line 21 between switch 26 and point 50 are equal to Z, while the impedances of lines 17 and 21 between the diode switches and point 18 are equal to $\sqrt{2Z}$.

In the operation of the apparatus of Fig. 2 during a period that transmitter 40 is operative to supply oscillations to antennae 10 and 11 over transmission lines 14 and 15, the protective devices 45 and 46 are effective substantially to short-circuit the lines 47 and 49 at points 48 and 50 respectively, blocking transmission of high intensity signal of the transmitter to the receiver, the lines 47 and 49 being effective to cause the short-circuits at points 48 and 50 to appear as high impedances at points 15 and 19. During periods when the transmitter is inoperative, the cutout circuits 70 and 71 are effective to isolate the transmitter from the receiver circuits and prevent attenuation of the incoming signals.

Cyclic alternation of transmission of signals from antennae 10 and 11 to the receiver 12 may be provided by alternately biasing the diodes of switches 23 and 25 to cutoff condition, transmission of signals from the connected antennae to the receiver being provided whenever one of these devices is non-conducting. In a manner similar to that explained in connection with the apparatus of Fig. 1 when used in conjunction with the switching arrangement of Fig. 3, simultaneous transmission of signals from both antennae to the receiver is effected over lines 17 and 21 by simultaneously biasing the diodes of devices 24 and 26 to cutoff condition. The impedance of lines 17 and 21 between the switches and point 18 is adjusted so that, during intervals that signals from both antennae are being transmitted simultaneously to the receiver 12, impedance matching throughout the connecting lines is obtained.

It is apparent that various modifications of the particular embodiments of my invention as shown may be made. Thus, for example, the switches 23—26 have been described as adjusted to parallel resonant conditions by means of variable capacitors 37 connected between the inner and outer conductors of the line 30. It is apparent that instead of using the capacitors 37, the lines may be adjusted to parallel resonance, also, by varying the length of the line. Thus, when such a line, short-circuited at one end at point 31, has a length less than a quarter wave length at the operating frequency, the line appears to possess an inductive reactance, whereas when the length of the line is greater than a quarter wave length, the reactance appears to be capacitive in character.

My invention may be applied likewise for switching transmitter signals between antennae, in which case the transmitter replaces the receiver 12 of Fig. 1. In such an application, it is preferable that the diodes 32 be replaced by switching devices which do not arc-over in the presence of high intensity signals on the circuit. In place of the diodes, therefore, capacitor switches, or any other suitable switching devices, may be used. In such an application, the impedance matching circuits described herein result in improved efficiency of transmitter operation in switching alternately between antennae or in connecting both antennae to the transmitter at one time.

My invention, moreover, is not limited to the use of impedance balanced circuits with a pair of antennae; instead, the circuits may be used with any number of antennae or other types of loads or sources and an equal number of parallel paths between antennae and the receiver or transmitter or such other loads or sources.

It will be understood, therefore, that I do not wish to be limited to the particular embodiments shown since various modifications may be made and I contemplate by the appended claims to cover any such modifications as fall within the true spirit and scope of my invention.

What I claim as new and desire to secure by Letters Patent of the United States is:

1. In combination, a radio input circuit, a pair of signal channels supplying high frequency oscillations thereto, and means for selectively connecting any one or both of said channels to said circuit and for maintaining the impedance presented to said circuit at a constant value for all of said connections, said means comprising a pair of parallel paths connected between each of said channels and said circuit, each of said paths having a length equal to a multiple of a quarter wave length at the frequency of said oscillations and the first path of each of said pairs individually and the second paths of said pairs conjointly having a surge impedance substantially equal to the input impedance of said circuit, and means selectively to permit translation of signals over one of said first paths or both of said second paths and to prevent translation of signals over the remainder of said paths.

2. In combination, a radio receiver, a pair of antennae supplying high frequency oscillations thereto, and means selectively to connect any one or both of said antennae to said receiver and to maintain the impedance presented to said receiver at a constant value for all connections comprising, a pair of parallel paths connected between each of said antennae and said receiver, each of said paths having a length equal to a multiple of a quarter wave length at the frequency of said oscillations and a first path of each of said pairs and the second paths of said pairs conjointly having a surge impedance substantially equal to the input impedance of said receiver, electronic switches connected across said paths at points spaced a quarter wave length from said receiver, and means selectively to render non-conductive the switch across either of said first paths alternately and the switches across said second paths simultaneously.

3. In combination, a pair of antennae, receiving apparatus connected therewith to receive oscillations therefrom, a transmitter connected therewith to supply oscillations thereto, means for interrupting transmission of oscillations to said receiver when said transmitter is operating to produce oscillations of high intensity, and means selectively to connect said receiver to one or both of said antennae between periods of operation of said transmitter, said selective means comprising, a pair of first transmission lines connected between said receiver and a respective one of said antennae and each having a surge impedance equal to the input impedance of said receiver, a pair of second transmission lines connected in shunt to said first lines, said second lines conjointly presenting to said receiver an impedance equal to said input impedance, a unilaterally conducting device connected across each of said lines at a point spaced from the input to said receiver by a distance equal to a quarter wave length at the frequency of said oscillations, said devices normally being conductive whereby transmission of oscillations over said lines to said receiver is prevented, and means whereby one or the other of the devices connected with said first lines and both of the devices connected with said second lines may be rendered non-conductive selectively.

4. In combination, a high frequency load circuit, a pair of high frequency channels for supplying very high frequency oscillations thereto, and means selectively to connect any one or both of said channels to said circuit and to maintain the impedance presented to said circuit substantially constant comprising, a pair of parallel paths connected between each of said channels and said circuit, each of said paths having a length equal to a multiple of a half wave length at the frequency of said oscillations, a first path of each of said pairs and the second paths of said pairs conjointly having a surge impedance substantailly equal to the surge impedance of said circuit, a concentric transmission line connected across each of said paths at a point spaced from said circuit by a distance equal to a quarter wave length of said oscillations, said line having a length equal to a quarter wave length of said oscillation, a diode connected across said line at its end remote from its respective one of said paths, and means selectively to bias said diodes to cutoff, thereby to permit translation of said oscillations over its associated path.

5. In combination, an ultra high frequency circuit, a pair of channels supplying ultra high frequency oscillations thereto, and means for selectively connecting either or both of said channels to said circuit and for maintaining the impedance presented to said circuit at a constant value for all of said connections, said means comprising a pair of parallel paths connected between each of said channels and said circuit, each of said paths having a length equal to a multiple of a quarter wave length at the frequency of said oscillations and a first path of each of said pairs individually and the second paths of said pairs conjointly having a surge impedance substantially equal to the input impedance of said circuit, and switching means for selectively permitting translation of said oscillations over either of said first paths or both of said second paths simultaneously and for preventing translation of oscillations over the remainder of said paths.

References Cited in the file of this patent

UNITED STATES PATENTS

| Number | Name | Date |
|---|---|---|
| 1,458,466 | Crossley | June 12, 1923 |